United States Patent Office 3,052,699
Patented Sept. 4, 1962

3,052,699
PREPARATION OF POLYUNSATURATED
FATTY ACIDS
Robert E. Beal, Elmwood, Ill., assignor to the United States of America as represented by the Secretary of Agriculture
No Drawing. Filed Aug. 31, 1960, Ser. No. 53,311
4 Claims. (Cl. 260—413)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This invention relates to an improved method of separating mixtures of fatty acids present in vegetable oil hydrolysates to obtain therefrom substantially pure fatty acids. Specifically, the object of the invention is to provide a process whereby mixed fatty acids derived from vegetable oils, such as safflower and linseed oils, are separated by liquid-liquid extraction to produce substantially pure linoleic and linolenic acids. Further objects and advantages of the invention will be obvious from the following description.

Vegetable oils derived from the seeds of plants, by mechanical pressing or by extraction with suitable solvents, consist principally of triglycerides of fatty acids. Certain of these oils contain principally unsaturated fatty acids. Safflower oil which is obtained from domestically produced safflower seed, and is an important article of commerce, contains about 75 percent of linoleic acid. Linseed oil generally contains over 50 percent of linolenic acid.

When oils such as there are treated with water under proper conditions of temperature and pressure, with or without catalyst, the triglycerides are hydrolyzed to give mixed fatty acids and glycerine. The mixture of fatty acids thus obtained contains stearic, palmitic, oleic, linoleic and linolenic acids in various amounts.

The mixed vegetable oil fatty acids have certain industrial uses, particularly in the manufacture of coating vehicles such as alkyd resins. However, for many other uses it is necessary that relatively pure acids be available. Thus, stearic acid of high purity is used in cosmetics, rubber products, greases and lubricants, and many other items. Oleic acid is used in fine soaps, cosmetics, and pharmaceuticals. The polyunsaturated acids, such as linoleic and linolenic acids, have not been available commercially at a price which would permit their use on a large scale because an economical method has not heretofore been available for producing them in relatively pure form. By "relatively pure" is meant a purity of 95 percent or higher. Many potential uses for linoleic and linolenic acids are known and would be adopted if the substantially pure acids were to become available at a lower price.

A general method for separating fatty acids of different degrees of unsaturation and chain length is by liquid-liquid extraction with suitable solvents. The present invention relates to a specific improvement in that method of separation. It has been known for some time that a degree of separation of fatty acids could be made in this way, but an effective continuous process has not heretofore been devised to use this method for making relatively pure polyunsaturated fatty acids. To make such a separation to obtain substantially pure linoleic and linolenic acids closely controlled conditions of operation are required.

Freeman, U.S. Patent No. 2,278,309, broadly teaches that polyunsaturated vegetable oil fatty acids may be fractionated between a polar solvent such as furfural containing 1-15 percent added water and a non-polar hydrocarbon secondary solvent such as iso-octane. However, it is apparent from the wide range of water taught in the said patent and the poor exemplary results shown therein that the patentee failed to teach the criticality of a 1-3 percent addition of water to the polar solvent.

In my improved method for obtaining substantially pure linoleic or linolenic acids, a vegetable oil, preferably one such as safflower oil which contains a high content of linoleic acid and little or no linolenic acid, or an oil such as linseed oil which contains a high content of linolenic acid, is used as the respective sources of the two acids. The oil is first hydrolyzed to free the fatty acids from the glycerol. This may be accomplished by any one of several well known methods. Since it is important to the subsequent extraction process that the fatty acids undergo the least possible amount of oxidation because oxidized fatty acids are more soluble in the polar solvent used in the extraction than are unoxidized acids, the hydrolysis of the oil to fatty acids should be conducted using oil which has been deaerated under vacuum, and the mixed fatty acids should be used quickly or stored under an inert atmosphere until they are subjected to liquid-liquid extraction.

As in the prior art, my liquid-liquid extraction is conducted using two solvents, namely an aliphatic hydrocarbon and furfural, the latter containing 1-3 percent water. When these solvents are passed countercurrently through an extraction column or centrifugal extractor and the deaerated mixed fatty acids derived from safflower oil are introduced to the midpoint of the column or extractor, the fatty acids become distributed between the two solvents, the more unsaturated fatty acids being found in the furfural, and the more saturated fatty acids in the hydrocarbon solvent phase. I have found that when the deaerated feed mixed fatty acids comprising about 75 percent linoleic acid (as when derived from domestic safflower oil) the fatty acids recovered from the furfural phase issuing from the countercurrent extraction device, after evaporation of the solvent, comprised over 95 percent linoleic acid, providing the additional following conditions are met:

(1) The countercurrent extraction device is designed and operated to provide at least about 30 equilibrium extraction stages.

(2) The extraction temperature is between about 60° F. and 120° F.

(3) The water content of the furfural used as the selective solvent is between about 1 and 3 percent, or water in an equivalent amount is introduced into the extractor with dry furfural.

(4) The weight ratio of furfural to fatty acids fed to the extractor is greater than about 10.

(5) Combined feed rates of furfural, hydrocarbon solvent, and deaerated fatty acids is less than the minimum amount which will produce a flooding condition in the extractor.

(6) The hydrocarbon solvent feed rate to the extractor is an amount such that the percentage of the deaerated feed fatty acids which were dissolved in the furfural phase issuing from the extractor (the percent extract) does not exceed the linoleic acid content of the feed acids.

The same conditions apply to the extraction of linolenic acid, in a purity of over 95 percent, from deaerated mixed linseed fatty acids.

*Example 1*

As an example of this invention, deaerated safflower fatty acids containing 76 percent linoleic acid were subjected to liquid-liquid extraction using furfural (containing 2.5 percent water) and hexane as the immiscible solvents. The extractor was a centrifugal type Podbielniak having 36 actual mixing and settling stages, with provision for introducing the fatty acids into the extractor midway between the solvent feed points. All feed streams to the extractor were preheated to 100° F. and cooling water was sprayed on the rapidly revolving centrifugal extractors to overcome heat build-up which results from liquid-flow friction and mixing and to hold the product streams issuing from the extractor at 100° F. Feed rates to the extractor in pounds per hour were furfural 30, hexane 6, safflower fatty acids 2. Seventy-four percent of the fatty acids fed to the extractor were recovered in the extract phase from the extractor. After evaporation of the solvent, the fatty acids were found to comprise 95 percent linoleic acid, the balance being about equal amounts of oleic and palmitic acids. The analysis of the acids was made on the methyl esters of the acids by the method of gas-liquid chromatography and also by the official alkali isomerization method of the American Oil Chemists' Society.

*Example 2*

Deaerated linseed oil fatty acids containing 55 percent of linolenic acid were extracted in the same equipment under the following conditions:

| | |
|---|---|
| Furfural feed rate | 25 lb./hour |
| Hexane feed rate | 10.0 lb./hour |
| Linseed fatty acids feed rate | 1.7 lb./hour |
| Percent water in furfural | 1.1 percent |
| Temperature of feed and product streams | 110° F. |
| Percent of feed acids recovered as extract | 42 percent |
| Linolenic acid in extract acids | 97.8 percent |

When the hexane feed rate was increased to 12.0 pounds per hour the percent of feed acids recovered as extract was 33 percent but the linolenic acid content of the extract was unchanged.

*Example 3*

Using a series of separatory funnels immersed in a water bath at 100° F., a 24-stage countercurrent batch extraction was performed using the same deaerated linseed oil fatty acids and solvents as in Example 2. After equilibrium conditions were obtained the extract fatty acids were analyzed and found to contain 92 percent linolenic acid. By graphical extrapolation it is estimated that about 30 equilibrium stages are required to separate linolenic acid in 95 percent or higher purity, from deaerated linseed fatty acids containing 55 percent linolenic acid. Any continuous, countercurrent, liquid-liquid extraction apparatus or equipment, designed to provide that number of equilibrium stages, or more, could be used to perform the separation, including vertical packed columns, columns with agitators and baffles, sieve plate columns, sieve plate pulsed flow columns, or other types.

A further experiment conducted in the same apparatus using iso-octane as the hydrocarbon solvent, showed that there is no difference between results obtained using iso-octane and those obtained with hexane.

Having thus described my invention, I claim:

1. A method comprising deaerating an oil selected from the group consisting of safflower oil and linseed oil, respectively, hydrolyzing the deaerated oil in the absence of free oxygen to free the mixed constituent acids, isolating the mixed fatty acids, combining one part by weight of the mixed free acids, preheated to 100° F., with at least about 10 parts by weight of similarly preheated furfural containing about from 1 to 3 percent of water, and about 3 parts by weight of a preheated member selected from the group consisting of hexane and iso-octane, feeding the heated component streams to a centrifugal extractor, externally cooling the said extractor to hold the streams issuing therefrom to a temperature of about 100° F., and recovering substantially pure linoleic acid and substantially pure linolenic acid, respectively.

2. A process comprising deaerating an oil selected from the group consisting of safflower oil and linseed oil, respectively, hydrolyzing the deaerated oil in the absence of free oxygen to free the mixed constituent saturated and unsaturated fatty acids, the latter including linoleic acid and linolenic acid, respectively, isolating said mixed fatty acids, subjecting said mixed fatty acids to liquid-liquid countercurrent extraction of at least about 30 equilibrium stages at a temperature of about from 60° to 120° F., the liquids being furfural, containing about from 1 to 3 percent water, and an aliphatic hydrocarbon solvent immiscible with the furfural and selected from the group consisting of hexane and iso-octane, said furfural and aliphatic hydrocarbon solvent being employed in the proportion of at least about 10 parts by weight of furfural and at least about 3 parts by weight of the aliphatic hydrocarbon solvent per part by weight of the mixed fatty acids, thereby to produce a furfural phase containing the more unsaturated fatty acids including the linoleic and linolenic acids, respectively, and an aliphatic hydrocarbon solvent phase containing the more saturated fatty acids at each of said equilibrium stages, and recovering linoleic acid and linolenic acid, respectively, in a yield exceeding about 95%, from the furfural phases.

3. The process of claim 2 wherein the oil is safflower oil.

4. The process of claim 2 wherein the oil is linseed oil.

References Cited in the file of this patent

UNITED STATES PATENTS

| | | |
|---|---|---|
| 2,191,455 | Davis | Feb. 27, 1940 |
| 2,278,309 | Freeman | Mar. 31, 1942 |
| 2,313,636 | Freeman | Mar. 9, 1943 |

OTHER REFERENCES

Beal et al.: Journal of the American Oil Chemists Society, vol. 36, pp. 397–400 (1959).

Gloyer: Industrial and Engineering Chemistry, vol. 40, pp. 228–236 (1948).